United States Patent [19]

Soga et al.

[11] Patent Number: 4,913,864

[45] Date of Patent: Apr. 3, 1990

[54] PROCESS FOR PREPARATION OF POROUS HOLLOW FILAMENT

[75] Inventors: Kouzi Soga; Nobuo Taneda, both of Iwakuni, Japan

[73] Assignee: Teijin Limited, Osaka, Japan

[21] Appl. No.: 250,420

[22] Filed: Sep. 28, 1988

[30] Foreign Application Priority Data

Nov. 19, 1987 [JP] Japan ................................ 62-290533
Feb. 10, 1988 [JP] Japan .................................. 63-27632

[51] Int. Cl.$^4$ ........................ D01D 5/247; D01F 2/24
[52] U.S. Cl. ...................................... 264/41; 264/102; 264/209.1; 264/187; 264/203; 264/211.11; 264/211.16; 264/211.22; 264/211.23; 264/349; 210/500.30; 210/500.31
[58] Field of Search .............. 264/102, 211.21, 211.22, 264/211.23, 41, 349, 209.1, 187, 203, 211.11, 211.16; 210/500.30, 500.31

[56] References Cited

U.S. PATENT DOCUMENTS

| | | | |
|---|---|---|---|
| 3,129,159 | 4/1964 | Maier et al. | 204/180 |
| 3,423,491 | 1/1969 | McLain et al. | 264/49 |
| 3,483,282 | 12/1969 | Manjikian | 264/41 |
| 3,546,209 | 12/1970 | Lipps, Jr. | 260/214 |
| 3,567,809 | 3/1971 | Ueno et al. | 264/41 |
| 3,592,672 | 7/1971 | Rowley et al. | 106/189 |
| 3,593,855 | 7/1971 | Stana | 210/500 |
| 3,646,179 | 2/1972 | Stana | 264/41 |
| 3,679,788 | 7/1972 | Kiyono et al. | 264/349 |
| 3,772,072 | 11/1973 | Brown et al. | 264/41 |
| 3,773,534 | 11/1973 | Kaiser et al. | 264/49 |
| 3,780,147 | 12/1973 | Stana | 264/49 |
| 3,909,279 | 9/1975 | Manjikian | 106/180 |
| 3,957,935 | 5/1976 | Staude | 264/41 |
| 3,991,153 | 11/1976 | Klausner et al. | 264/211.21 |
| 4,147,622 | 4/1979 | Nussbaumer | 264/41 |
| 4,276,173 | 6/1981 | Kell et al. | 210/500.2 |
| 4,342,711 | 8/1982 | Joh et al. | 264/41 |
| 4,543,221 | 9/1985 | Chen et al. | 264/41 |
| 4,587,168 | 5/1986 | Miyagi et al. | 428/369 |
| 4,609,728 | 9/1986 | Spranger et al. | 536/56 |
| 4,681,713 | 7/1987 | Miyagi et al. | 264/41 |

FOREIGN PATENT DOCUMENTS

| | | |
|---|---|---|
| 0131143 | 1/1985 | European Pat. Off. . |
| 3447625 | 7/1985 | Fed. Rep. of Germany . |
| 53-82670 | 7/1978 | Japan . |
| 53-90367 | 8/1978 | Japan . |
| 58-84007 | 5/1983 | Japan . |
| 58-84845 | 5/1983 | Japan . |
| 59-199807 | 11/1984 | Japan . |
| 60-5202 | 1/1985 | Japan . |
| 60-235852 | 11/1985 | Japan . |

*Primary Examiner*—Hubert C. Lorin
*Attorney, Agent, or Firm*—Burgess, Ryan & Wayne

[57] ABSTRACT

A process for the preparation of a porous hollow filament composed mainly of an organic polymer, which comprises separately feeding a powder of the organic polymer and a liquid additive to a feed zone of twin-screw extruder, mixing the polymer with the additive in a kneading zone of the extruder to form a substantially liquid mixture, further kneading and compressing the liquid in a kneading and compressing zone of the extruder, feeding the liquid to an extruding zone of the extruder, and extruding the liquid from the extruding zone.

7 Claims, No Drawings

PROCESS FOR PREPARATION OF POROUS HOLLOW FILAMENT

BACKGROUND OF THE INVENTION

(1) Field of the Invention

The present invention relates to a process for the preparation of a porous shaped article composed mainly of an organic polymer. More particularly, the present invention relates to an improvement in the process for preparing a porous shaped article by using a twin-screw extruder. Especially, the present invention relates to a process suitable for efficiently preparing a porous hollow filament or the like.

(2) Description of the Related Art

A porous hollow filament or porous film composed of a cellulose ester polymer or polysulfone polymer is often used for fluid treatments, for example, liquid treatments such as filtration, ultrafiltration, and dialysis, and gas treatments such as a separation of gases.

These porous products are prepared mainly by wet shaping processes such as wet spinning, melt shaping processes such as melt spinning, and plasticizing melt shaping processes using a plasticizer, such as plasticizing melt spinning.

For example, in the production of a porous hollow filament according to the wet spinning process, a spinning solution which is a mixed solution comprising an organic polymer such as a polysulfone, a solvent, and a pore-forming agent is prepared in a preparing tank, the solution is fed to a spinning nozzle, the spinning solution is extruded from the nozzle together with a coagulating liquid for a hollow portion, the extrudate is immersed in a coagulating bath to coagulate the liquid, and the solvent and pore-forming agent are removed by extraction.

Furthermore, in the case of the plasticizing melt spinning of a cellulose ester polymer or in the case of the plasticizing melt spinning for forming a porous hollow filament by using a poor solvent, a complicated process is adopted in which the cellulose polymer is first pulverized, the pulverized cellulose ester polymer is mixed and impregnated with a plasticizer, if necessary together with the poor solvent, by a blender or the like, the mixture is taken out and is heated and melt-extruded by a single-screw extruder, the extrudate is cooled and cue into a pelletized chip, the chip is dried by a hot air drier, the dried chip is heated and melted again, the melt is spun into a hollow filament by a spinning machine, the filament is cooled and solidified, the plasticizer or the plasticizer and poor solvent are removed by extraction with water or the like, and the formed porous yarn is wound.

In these conventional processes, a liquid to be supplied to a molding-extruding means such as a spinning nozzle must be prepared in advance through a preliminary step such as a mixing step or chip-forming step, and thus rationalization of the steps is necessary.

As the prior art reference disclosing a process for preparing a hollow yarn by a twin-screw extruder, there can be mentioned Japanese Unexamined Patent Publication No. 59-30825. According to this process, cellulose triacetate as a polymer is mixed with an organic solvent and a non-solvent over a period of 1 to 3 hours, the obtained powder impregnated with the solvent is transferred to a tank provided with a feed screw, the solvent-impregnated powder is fed from the tank to a feeding zone of an extruder, deaeration is effected during this feeding, the powder is kneaded and melted at 100° to 220° C., and the melt is compressed and extruded from a nozzle zone. This process, however, is disadvantageous in that a long time is required for the preliminary impregnation step, and that the influence of the affinity between the polymer and the solvent is strong at the impregnation step.

SUMMARY OF THE INVENTION

An object of the present invention is to provide a rationalized process for preparing a porous shaped article without conducting the starting material-mixing step adopted in the conventional processes, such as the mixing, chip-forming or drying step, especially a process in which a porous hollow filament can be prepared efficiently and stably.

The present inventors investigated the structure and conditions of an extruder, the particle size of the starting organic polymer, and the kinds of additives such as a plasticizer, with a view to attaining the above-mentioned object, and as a result, found that the use of a twin-screw extruder is very effective, and an independent supply of the starting powder and liquid to this extruder is especially effective, and the present invention was completed based on this finding.

More specifically, in accordance with the present invention, there is provided a process for the preparation of a porous shaped article composed mainly of an organic polymer, which comprises separately feeding a powder of the organic polymer and a liquid additive to a feed zone of twin-screw extruder means, mixing the polymer with the additive in a kneading zone of the extruder means to form a substantially liquid mixture, further kneading and compressing the liquid in a kneading and compressing zone of the extruder means, feeding the liquid to an extruding zone of the extruder means, and extruding the liquid from the extruding zone.

Note, the term "a substantially liquid mixture" refers to a mixture in which at least a part of the powder is dissolved to an extent such that air tightness can be maintained just before a vent zone of the twin-screw extruder, i.e., upstream of the vent zone.

DESCRIPTION OF THE PREFERRED EMBODIMENTS

The present invention will now be described in detail.

The twin-screw extruder used in the present invention has a vent zone, and preferably, after a powder of an organic polymer and a liquid additive are mixed in a kneading zone of the extruder to form a substantially liquid mixture, this substantially liquid mixture is deaerated under a reduced pressure in the vent zone and then fed to a kneading and compressing zone. Where deaeration is not carried out in the vent zone, preferably the starting material is sufficiently dried before being supplied to the twin-screw extruder.

A characteristic feature of the present invention is that the powdery organic powder and the liquid additive are separately fed to a feed zone of twin-screw extruder means, i.e., an extruder means comprising two extruder elements arranged in parallel to and meshed with each other. Preferably, a powder feed zone and a liquid feed zone are independently arranged as the feed zone, and to ensure a continuous and stable feed of the powder and liquid with a good metering effect, preferably the liquid feed zone is arranged after the powder feed zone, especially just after the powder feed zone. More specifically, preferably a feeding method is adopted in which a powder is quantitatively fed to the powder feed zone by a screw feeder and the liquid is quantitatively fed to the liquid feed zone by a pump or the like. In the present invention, the operation of mixing the powder and liquid in advance is not necessary, and preferably the powder feed zone and liquid feed zone are independently disposed, as described above, but a method can be adopted in which the powder and liquid are independently fed to one feed zone.

The twin-screw extruder means used in the present invention has a kneading zone arranged downstream of the feed zone, and this kneading zone is disposed for kneading the polymer and additive, if necessary under heating, to form a substantially liquid mixture as a whole. If the screw rotation number and the kneading intensity [determined according to the kind of kneading element and the L/D ratio of the kneading zone in which L stands for the overall length (mm) of the kneading element zone and D stands for the diameter (mm) of the circumference of the element] are enhanced as the kneading conditions, the kneading property can be improved, but simultaneously, the color is degraded by the thermal deterioration caused by the kneading shearing force. Therefore, the kneading conditions as well as the temperature should be appropriately determined while taking the balance between the kneading property and the color into consideration. For example, a screw rotation number of 100 to 300 rpm is necessary, and preferably an appropriate screw rotation number is adjusted within the above-mentioned range by controlling the extrusion quantity and the top end pressure, in view of the kneading property of the polymer and the like, and the color. The kneading characteristic is easily influenced by the rotation direction of the screw, and thus the rotation direction of the screw should be appropriately selected according to the characteristics of the polymer and the like. For example, in the case of an organic polymer having a high adherence to the screw zone of the extruder, if the two screws of the twin-screw extruder are rotated in the same direction, a molten polymer having a good kneading property and a good color can be easily obtained. If the shearing speed is used as the index expressing the kneading strength, preferably the shearing speed is 30 to 250 sec$^{-1}$ in the case of the kneading element or 100 to 450 sec$^{-1}$ in the case of the full-flight screw. Note, the shearing speed is expressed by the following formula:

$$\frac{\pi D \text{ (mm)} \times \text{rotation number (rpm) of extruder}}{60 \text{ (sec/min)} \times \text{groove depth (mm)}}$$

In the above-mentioned formula, D stands for the diameter of the element or screw and the groove depth is the vertical distance from the top of the screw thread to the bottom of the trough.

Preferably, the twin-screw extruder means used in the present invention is provided with a vent downstream of the kneading zone, and the substantially liquid mixture formed in the kneading zone is deaerated in the vent portion. In connection with the conditions of the deaeration in the vent portion, which depend on the vapor pressure of the used liquid additive and the temperature in the vent zone, preferably the deaeration is carried out when little evaporation of the liquid additive has occurred. For example, in the case of the plasticizing melt spinning of a cellulose ester polymer by using a polyhydric alcohol as the additive, preferably the deaeration is carried out at a pressure lower than 400 mmHg a, especially lower than 200 mmHg a, particularly specially lower than 100 mmHg a.

In the twin-screw extruder means used in the present invention, a kneading and compressing zone is disposed downstream of the vent zone, and in this kneading and compressing zone, the deaerated liquid is further kneaded and compressed and then fed to an extruding zone. Also, the temperature and pressure of the rear kneading and compressing zone have a strong influences on the kneading property of the polymer and the color. For example, in the case of the above-mentioned plasticizing melt-spinning of the cellulose ester, since the polymer is melted under a high temperature and a high shearing force within a short time in the front kneading zone, the temperature of the polymer rises to about 240° C., and by lowering the cylinder temperature to about 180° to about 200° C. in the rear kneading and compressing zone, the polymer temperature is adjusted and discoloration of the polymer can be prevented, whereby spinning can be stably performed.

Elevation of the pressure in the extruding zone is necessary to make it possible to feed the liquid mixture containing the polymer under pressure and stably perform the shaping operation, and generally the pressure in the extruding zone is preferably 10 to 100 kg/cm$^2$G. If the pressure exceeds 100 kg/cm$^2$, the vent is increased and simultaneously, the polymer temperature is elevated by a generation of heat due to the shear stress, resulting in an increased coloration of the polymer. Accordingly, to high a pressure is not preferred. In contrast, if the pressure is too low, feeding of the liquid becomes difficult due to conduit resistance, and a stable shaping is difficult at a pressure lower than 10 kg/cm$^2$. Therefore, too low a pressure is not preferred. Note, preferably a filter means for removing solids having an undesirable affect on the shaping operation is disposed before the extruding zone.

In the present invention, the twin-screw extruder may be either a horizontal or vertical type, but in view of the stability of feeding of the powder, a horizontal type twin-screw extruder is preferred.

In the present invention, if the average residence time of the fed organic polymer in the twin-screw extruder means for carrying out the series of the above-mentioned steps is too long, thermal deterioration of the polymer occurs, and thus a too long average residence time is not preferred. Namely, the upper limit of the average residence time in the twin-screw extruder means should be set at a level at which substantial thermal deterioration of the polymer will not occur. To stably prepare a porous shaped article, preferably the lower limit of the average residence time is set at 1 minute, especially 1.5 minutes. Note, the average residence time referred to herein denotes the average value of the time from the point of initiation of the contact of the organic polymer with the liquid additive to the point of extrusion from the extruding zone.

Preferably, the water content of the starting polymer is controlled within a specific range. For example, if the water content of the powder of the cellulose ester polymer is adjusted to a level lower than 3%, shaping can be stably performed. More specifically, when the water content is adjusted within this range, if the pressure in the vent of the twin-screw extruder is adjusted to a level lower than 400 mmHg a, the water content in the molten polymer can be easily controlled below 0.6%, and leak from the yarn or yarn breakage by a formation of bubbles by residual water at the spinning step or dropping of [$\eta$] at the melting step does not substantially occur.

In this case, if the pressure in the vent portion is higher than 400 mmHg a, the removal of water becomes unsatisfactory and bubbles are often formed in the spun polymer. If the pressure in the vent portion is lower than 10 mmHg a, evaporation of the plasticizer becomes conspicuous and good results can not be obtained.

In the process of the present invention, the liquid extruded from the extruder can be shaped by customary procedures. For example, in the plasticizing melt shaping or the melt shaping, after the extrusion, cooling, winding, extraction removal of the additive, replasticization, drying, and winding are carried out, in this order. Furthermore, in the wet shaping, after the extrusion, coagulation, washing, replasticization, drying, and winding are carried out, in this order. In this case, a gear pump or the like may be disposed after the extruding zone of the twin-screw extruder, to feed the molten polymer to the subsequent step.

Furthermore, in the process of the present invention, the dry shaping method or the semi-dry semi-wet shaping method can be adopted.

As the organic polymer used in the present invention, in the case of the plasticizing melt shaping, there can be mentioned heat-decomposing polymers and heat-curable polymers. As specific examples, there can be mentioned cellulose acetates such as cellulose diacetate and cellulose monoacetate, and cellulose esters such as cellulose nitrate and cellulose propionate. Among the above, a cellulose acetate is advantageous for use.

As the organic polymer used in the melt shaping in the present invention, there can be mentioned a thermoplastic polymer, and as specific examples, there can be mentioned polyesters, polyamides, polyolefins, polystyrene, polycarbonate, polyvinyl chloride and polysulfones. These thermoplastic polymers also can be used in the above-mentioned plasticizing melt shaping.

As the polymer used in the wet shaping in the present invention, there can be mentioned cellulose esters as mentioned above, polysulfones such as polysulfones and polyether sulfones, and polymethyl methacrylate. Among the above, cellulose esters and polysulfones are preferred.

A plasticizer is mainly used as the additive in the plasticizing melt spinning, and a poor solvent for the organic polymer is used as the pore-forming agent. An inorganic substance such as a salt may be incorporated, if desired.

Any plasticizer having a plasticizing action on the polymer can be used. For example, if the polymer is cellulose acetate, a polyhydric alcohol can be used. As the polyhydric alcohol, there can be mentioned, for example, ethylene glycol, propylene glycol, diethylene glycol, tetramethylene glycol, pentamethylene glycol, polyethylene glycol, propylene glycol, polypropylene glycol, glycerol and diglycerol methylcarbitol.

A pore-forming agent is used as the additive in the melt shaping in the present invention. As specific examples, there can be mentioned polyethylene glycol, polypropylene glycol, glycerol, phthalic acid esters and fatty acid esters.

An organic solvent, and if necessary, a pore-forming agent, are used as the additive in the wet shaping in the present invention. For example, there can be mentioned cyclohexanol, dimethylformamide, dimethylacetamide, N-pyrrolidone, cyclohexanone, acetone, isopropanol, methanol, polyethylene glycol, polypropylene glycol and glycerol.

The present invention is characterized in that the powder of the organic polymer and the liquid additive are separately fed to the feed zone of the twin-screw extruder. To perform a stable shaping, preferably the feed ratio between the powder and the liquid additive is such that the additive is fed in an amount of at least 30 parts by weight per 100 parts by weight of the organic polymer, and the upper limit of the amount of the additive is preferably about 300 parts by weight per 100 parts by weight of the organic polymer. Note, to determine the characteristic properties of the porous shaped article, this ratio should be adjusted to a certain value within this range.

As main examples of the porous shaped article of the present invention, there can be mentioned hollow filament and a hollow film, and the pore-forming additive should be removed from the extruded shaped article by extraction or the like by a customary procedure.

The plasticizing melt spinning of a cellulose ester according to the present invention will now be described in detail. A powdery cellulose ester polymer is fed from a feed opening of a twin-screw extruder quantitatively by a ribbon feeder, and a liquid plasticizer is injected from a cylinder zone just after the feed opening for the cellulose ester polymer by a plunger pump. In a mixing and heating zone of the twin-screw extruder, the polymer and the plasticizer are mixed and heated at 180° to 240° C. to form a melt, and the melt is deaerated under absolute reduced pressure of 10 mmHg absolute to 360 mmHg absolute. The deaerated melt is further kneaded and compressed to 10 to 100 kg/cm$^2$G, and the compressed melt fed to a spinning nozzle zone and extruded in the form of a filament from the nozzle zone.

According to the present invention, a porous hollow fiber and a porous film suitable for a dialysis of blood, ultrafiltration, separation of gases and the like can be prepared, for example, by the above-mentioned plasticizing melt spinning of a cellulose ester polymer.

The present invention will now be described in detail with reference to the following examples, that by no means limit the scope of the invention.

EXAMPLE 1

A powdery cellulose diacetate flake having an acetylation degree of 55.0% and a water content of 1.5% (the content of the fraction capable of passing through a 50-mesh screen was at least 90%) was quantitatively supplied into a lateral twin-screw extruder from a powder feed opening formed in the vicinity of the upstream end of the extruder by a ribbon feeder, and polyethylene glycol (having a polymerization degree of 400 and a water content of 0.5%) was fed in an amount of (a) parts by weight per 100 parts by weight of the flake into the extruder from a liquid feed opening located after the powder feed opening by a plunger pump. In a mixing and heating zone (i.e., a kneading zone) of the twin-screw extruder, the cellulose diacetate flake and polyethylene glycol were mixed and heated at 180° to 240°C. to form a plasticized melt. Then, the melt was vacuum-deaerated under (b) mmHg a in a vent zone of the twin-screw extruder, and in a kneading and compressing zone of the twin-screw extruder, the melt was kneaded at a temperature of (c) °C. and simultaneously compressed under a pressure of (d) kg/cm$^2$G. Then, the melt was fed to a spinning nozzle and extruded from a double-tube nozzle together with nitrogen forming a hollow portion to form a hollow filament by spinning. The rotation number of the twin-screw extruder was adjusted to 200 rpm, and the average residence time of the polymer was adjusted to 170 seconds.

Note, a twin-screw extruder, Model TEX-44 supplied by Nippon Seikosho, was used in these experiments. In this extruder, the L/D ratio of the whole screw zone was 33 (the total L/D ratio of the twin-kneading element zone was 17 and the total L/D ratio of the full-flighted screw zone was 16), a one-stage vent was provided, and kneading disks having a diameter of 44 mm (supplied by Nippon Seikosho) were used as the kneading elements. More specifically, kneading disks having an L/D ratio of 4 to 12 were arranged just after a screw portion provided with a feed zone, i.e., in the kneading zone, and kneading disks having an L/D ratio of 1.5 to 5 were arranged in the top end portion of the screw, i.e., in the kneading and compressing zone. The experiments were carried out under the conditions shown in Table 1. Note, a full-flight screw having a groove structure was used for the other screw zone. The L/D ratio of the full-flighted screw zone provided with the starting material feed opening, which was disposed upstream of the kneading zone, was substantially the same as the L/D ratio of the full-flighted screw zone disposed between the kneading zone and the kneading and compressing zone. The results are shown in Table 1.

TABLE 1

| Run No. | 1 | 2 | 3 | 4 | 5 |
|---|---|---|---|---|---|
| Rotation directions | same | same | same | same | same |
| a (g/100 g of polymer) | 40 | 40 | 40 | 40 | 40 |
| b (mmHg a) | 10 | 10 | 10 | 10 | 10 |
| c (Kg/cm$^2$G) | 50 | 50 | 50 | 50 | 50 |
| d (°C.) | 233 | 233 | 233 | 233 | 233 |
| Total L/D of screw | 33 | 33 | 33 | 33 | 33 |
| L/D of kneading zone | 9 | 9 | 12 | 4 | 6 |
| L/D of kneading and compressing zone | 3 | 5 | 5 | 1.5 | 3 |
| Kneading property of extruded strand (number of lumps/10 cm) | 0 | 0 | 0 | 16 | 4 |
| Color of extruded strand | 52 | 48 | 43 | 61 | 56 |
| [$\eta$] of extruded strand | 1.04 | 1.02 | 0.98 | 1.10 | 1.06 |

Since an intended molten polymer liquid having a good kneading property and color was obtained by using kneading disks having an L/D ratio of at least 9 in the kneading zone and kneading disks having an L/D ratio of at least 3 in the kneading and compressing zone, the following spinning operations were carried out while setting the L/D ratios in the kneading zone and the kneading and compressing zone at 9 and 3, respectively.

Hollow filaments obtained by setting the above-mentioned conditions (a) through (d) at values shown in Table 2 were subjected to a post treatment of removing polyethylene glycol by extraction with hot water, and the hollow filaments were saponified with a 2% aqueous solution of an alkali to convert the cellulose to a saponified cellulose. Then, the filaments were neutralized and washed with water, and treated (replasticized) with a 40% aqueous solution of glycerol, followed by drying and winding.

To determine the water permeability, 8000 filaments were bundled, placed in a module case, and fixed with a heat-curable urethane resin, and both ends of the bundle were cut to open hollow portions, whereby a hollow yarn type module for the dialysis of blood was fabricated.

(1) The water permeability was determined by filling the module with water, closing one end, fixing a graduated glass tube to the other end, compressing the water surface in the glass tube under 100 mmHg, measuring the dropping speed of the water surface in the glass tube at 25° C., and measuring the amount UFR of water permeating through the fiber wall in the unit of ml/m$^2$·mmHg·hr.

(2) The kneading property of the extruded strand was determined by counting the number of lumps (highly viscous lumps formed due to insufficient plasticization) in an extruded strand having a diameter of 3 mm and a length of 10 cm.

(3) The color of the extruded strand was determined by measuring the L value by a color difference meter.

(4) The intrinsic viscosity [$\eta$] was measured with respect to a solution of cellulose diacetate from the extruded strand in acetone, using an Ostwald viscometer.

(5) The leak from the hollow yarn in the module was determined in the following manner. The opening communicating with the hollow portion of the module was closed, and the hollow yarn was compressed under 1 kg/cm$^2$G by compressed air supplied from the other end communicating with the hollow portion, and the other end was closed. When the pressure drop for 2 minutes was larger than 8 mmH$_2$O, it was judged that the hollow yarn was leaking.

The results are shown in Table 2.

TABLE 2

| Run No. | 6 | 7 | 8 | 9 | 10 | 11 | 12 | 13 |
|---|---|---|---|---|---|---|---|---|
| Rotation directions | same | same | same | same | same | same | different | different |
| a (g/100 g of polymer) | 40 | 40 | 40 | 30 | 250 | 20 | 40 | 40 |
| b (mmHg a) | 10 | 10 | 360 | 10 | 10 | 10 | 10 | 10 |
| c (kg/cm$^2$G) | 20 | 60 | 50 | 50 | 15 | 80 | 20 | 60 |
| d (°C.) | 230 | 236 | 233 | 235 | 200 | 243 | 230 | 236 |
| Kneading property (number of lumps/10 cm) of extruded strand | 0-1 | 0 | 0 | 0 | 0 | 0 | 3-5 | 0-2 |
| Color of extruded strand | 56 | 52 | 51 | 50 | 59 | 40 | 38 | 32 |
| [$\eta$] of extruded strand | 1.07 | 1.02 | 1.03 | 1.07 | 1.10 | 0.96 | 1.01 | 0.95 |
| Frequency of yarn breaking (per hour) at spinning step | 0 | 0 | 0 | 0 | 0 | 0 | 0-1 | 1-2 |
| UFR (l/m$^2$ · mmHg · hr) | 5.3 | 5.2 | 5.7 | 4.8 | 18.0 | 2.0 | 5.4 | 5.3 |
| Leak (%) in hollow yarn in module | 0 | 0-1 | 0 | 0 | | | 3 | 5 |

If the temperature of the mixing and heating zone (i.e., the kneading zone) was lower than 200° C., the polymer was not sufficiently dissolved and fish eyes were sometimes formed. If the pressure in the vent zone was higher than 450 mmHg a, the deaeration was insufficient and bubbles were contained in the extruded strand, and yarn breakage sometimes occurred. If the pressure of the kneading and compressing zone was 120 kg/cm², the liquid rose to the vent zone to cause clogging in the vent zone, and if the pressure in the kneading and compressing zone was 10 kg/cm²G, the feeding under pressure of the liquid was insufficient and an extrusion unevenness was caused by an insufficient back pressure in the gear pump.

While the L/D ratios in the twin-kneading element-arranged portions of the kneading zone and the kneading and compressing zone were maintained at 9 and 3, respectively, the average residence time of the cellulose diacetate polymer was changed by changing the L/D ratio in the other full-flighted screw portion. The results are shown in Table 3. Note, the screw rotation number was adjusted to 250 rpm and the temperature of the kneading zone (the mixing and heating zone) was adjusted to 190° to 235° C. The L/D ratio of the full-flighted screw upstream of the kneading zone was substantially the same as that of the full-flight screw between the kneading zone and the kneading and compressing zone. The shearing speed was 140 sec$^{-1}$ at the full-flighted screw zone and 110 sec$^{-1}$ at the kneading disk zone.

TABLE 3

| Run No. | 14 | 15 | 16 | 17 |
|---|---|---|---|---|
| a (g/100 g of polymer) | 40 | 40 | 40 | 40 |
| b (mmHg a) | 10 | 10 | 10 | 10 |
| c (Kg/cm²G) | 50 | 50 | 50 | 50 |
| d (°C.) | 240 | 240 | 234 | 221 |
| L/D of full flighted screw portion | 23 | 21 | 14 | 8 |
| Average residence time (seconds) | 120 | 90 | 60 | 30 |
| Kneading property (number of lumps/10 cm) of extruded strand | 0 | 0–1 | 2–3 | many |
| Color of extruded strand | 45 | 54 | 60 | 65 |
| [η] of extruded strand | 1.01 | 1.06 | 1.12 | 1.17 |

Note, in run 17, a formation of fish eyes due to a non-dissolution of the polymer was observed in the extruded strand. Namely, if the average residence time was shorter than 1 minute, a satisfactory kneading property was not obtained.

EXAMPLE 2

A powdery cellulose diacetate flake having an acetylation degree of 55.0% (the content of the fraction capable of passing through a 50-mesh filter was at least 90%), which had been vacuum-dried under about 5 mmHg a at a temperature of 50° C. for 8 hours to adjust the water content to 0.3% by weight, and polyethylene glycol having a water content of 0.5% by weight (the polymerization degree was 400) were fed to the spinning nozzle zone by using the same twin-screw extruder as used in run 6 of Example 1 without performing the deaeration in the vent zone [the condition (b) was 760 mmHg a] and the melt was extruded in the form of a hollow filament from a double-tube nozzle. The screws were rotated in the same direction, and the conditions (a), (c), and (d) were 40 g/100 g of the polymer, and 230° C. and 20 kg/cm²G, respectively.

As a result, it was found that the kneading property of the extruded strand was 0 lump/10 cm, the color of the extruded strand was 52, [η] of the extruded strand was 1.03, and the frequency of yarn breakage at the spinning step was 0 per hour. It also was confirmed that the UFR of the hollow yarn obtained by performing the heat treatment in the same manner as in run 6 of Example 1 was 5.6 l/m²·mmHg·hr.

EXAMPLE 3

By using the same twin-screw extruder as used in run 1 of Example 1, a powder of a polyether-sulfone having structural units of

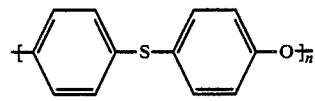

was fed from the powder feed opening, and polyethylene glycol (the polymerization degree was 600) and N-methyl-2-pyrrolidone were fed to the liquid feed opening in amounts of 25 parts by weight and 30 parts by weight, respectively, per 100 parts by weight of the polyether-sulfone. The screws were rotated in the same direction, and the fed materials were heated and mixed at 180° to 210° C. in the kneading zone, and the formed liquid was deaerated under 20 mmHg a in the vent zone. The liquid was kneaded at 190° C. and compressed under 30 kg/cm²G in the kneading and compressing zone, and the plasticized molten polymer was extruded in the form of a hollow filament from the double-tube nozzle.

The kneading property of the extruded strand was 0 lump/10 cm and satisfactory, and yarn breakage did not occur at the spinning step, and thus a good hollow yarn was obtained.

Polyethylene glycol and N-methyl-2-pyrrolidone were removed from the hollow yarn by extraction in water, and the hollow yarn was treated with an aqueous solution of glycerol and dried to obtain a porous hollow yarn having an ultrafiltration capacity.

EXAMPLE 4

By using the same twin-screw extruder as used in run 14 of Example 1, the same polyether-sulfone as used in Example 3 was fed from the powder feed opening and dimethylformamide was fed to the liquid feed opening as the solvent in an amount of 400 parts by weight per 100 parts by weight of the polyether-sulfone. The screws were rotated in the same direction, and the powder and liquid were heated and mixed in the kneading zone and the liquid mixture was deaerated under 50 mmHg a in the vent zone and compressed under 15 kg/cm² at 40° C. in the kneading and compressing zone. The melt was extruded from the double-tube nozzle together with water forming the hollow portion and immersed in water as the coagulating bath to form a porous filament.

The kneading property of the extruded strand was about 0 lump/10 cm and was satisfactory, and the porous filament obtained had a good quality.

We claim:

1. A process for the preparation of a porous hollow filament composed mainly of cellulose acetate, which comprises separately feeding a cellulose acetate powder and a liquid additive to a feed zone of a twin-screw extruder means, kneading and heating the cellulose acetate with the additive in a kneading and heating zone of the extruder means to form a plasticized melt, further kneading and compressing the plasticized melt in a kneading and compressing zone of the extruder means, feeding the plasticized melt to an extruding zone of the extruder means, and extruding the plasticized melt from the extruding zone in the form of a hollow filament and with removal of said liquid additive to thereby obtain said porous hollow filament.

2. A process for the preparation of a porous hollow filament according to claim 1, wherein the plasticized melt formed in the kneading zone of the extruder means is deaerated under a reduced pressure in a vent zone of the extruder means and is then fed to the kneading and compressing zone of the extruder means.

3. A process for the preparation of a porous hollow filament according to claim 1, wherein the average residence time of the cellulose acetate in the extruder means is longer than 1 minute and within a range such that thermal deterioration of the cellulose acetate does not occur.

4. A process for the preparation of a porous hollow filament according to claim 1, wherein the screws of the twin-screw extruder means are rotated in the same direction.

5. A process for the preparation of a porous hollow filament according to claim 1, wherein the amount of the additive is at least 30 parts by weight per 100 parts by weight of the cellulose acetate.

6. A process for the preparation of a porous hollow filament according to claim 1, wherein the cellulose acetate is cellulose diacetate.

7. A process for the preparation of a porous hollow filament according to claim 1, wherein the cellulose acetate powder and the liquid additive are kneaded and heated at 180° to 240° C. in the kneading and heating zone.

* * * * *